United States Patent

Shirn

[11] 4,020,647
[45] May 3, 1977

[54] COMBINATION OF CAPACITOR IN REFRIGERANT SYSTEM

[75] Inventor: George A. Shirn, Williamstown, Mass.

[73] Assignee: Sprague Electric Company, North Adams, Mass.

[22] Filed: Nov. 7, 1975

[21] Appl. No.: 629,838

[52] U.S. Cl. .................................................. 62/508
[51] Int. Cl.² ........................................ F25B 39/04
[58] Field of Search ............ 62/469, 508; 417/422, 417/902; 310/196

[56] References Cited

UNITED STATES PATENTS

| | | | |
|---|---|---|---|
| 2,043,058 | 6/1936 | Ploeger | 62/508 |
| 2,252,440 | 8/1941 | Safford | 62/508 |
| 2,976,699 | 3/1961 | Smith | 62/508 |
| 3,206,826 | 9/1965 | Samoden | 219/383 |
| 3,281,521 | 10/1966 | Wilson | 174/17 GF |

OTHER PUBLICATIONS

IEEE Transactions on Parts, Hybrids and Packaging, vol. PHP-11, No. 2, June 1975, "The Use of Fluorocarbon Gases to Prevent Arc-Over in DC Capacitors," Douglas H. Loescher.

*Primary Examiner*—Lloyd L. King
*Attorney, Agent, or Firm*—Connolly and Hutz

[57] ABSTRACT

An uncased polypropylene capacitor is located within a sealed refrigeration system so as to be impregnated with the halocarbon refrigerant employed in the system.

7 Claims, 3 Drawing Figures

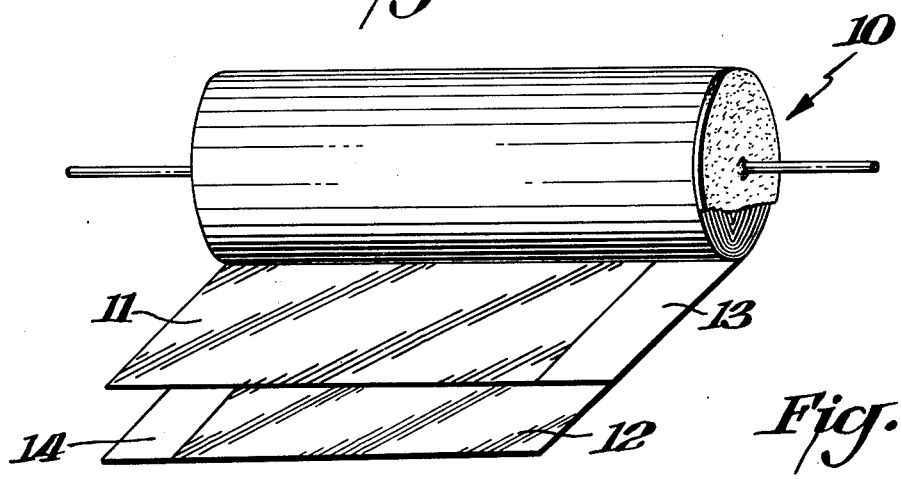
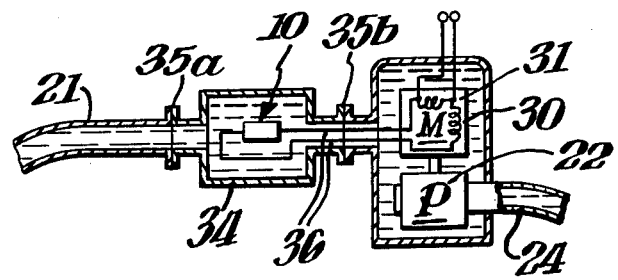
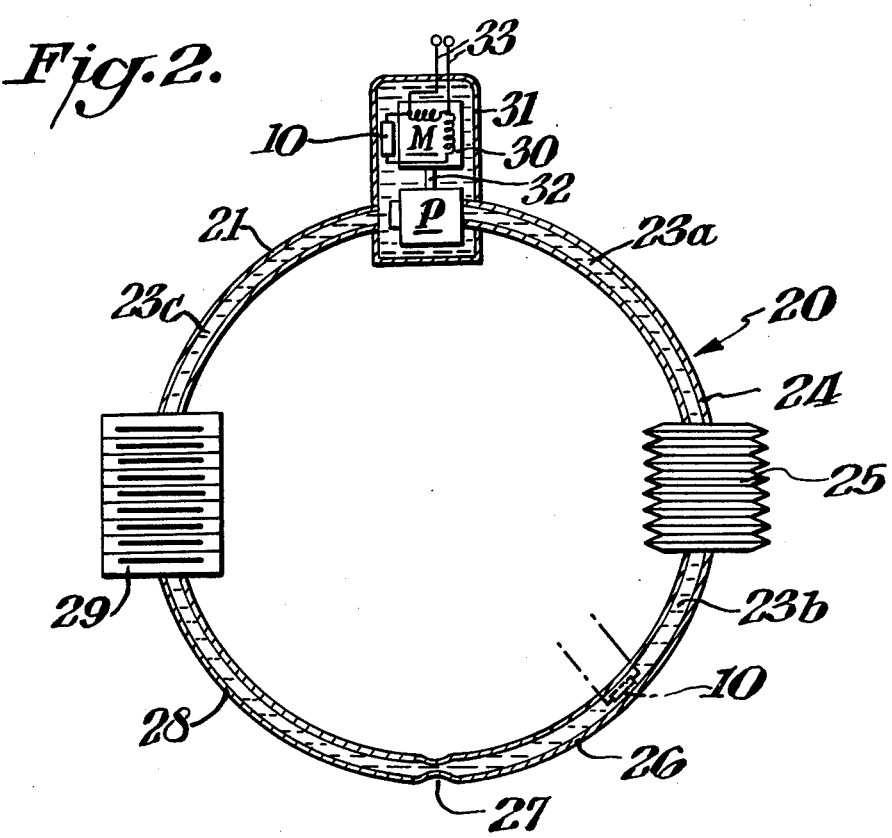

COMBINATION OF CAPACITOR IN REFRIGERANT SYSTEM

BACKGROUND OF THE INVENTION

This invention relates to an arrangement for combining a capacitance system within a sealed refrigeration system, and more particularly to a polypropylene film capacitor in a refrigeration system containing halocarbon fluid.

Capacitors used with single phase electric motors have been impregnated with oil to suppress corona by the oil filling the gaps or spaces left during the rolling of the capacitor. Capacitors employing metallized films of polyethylene terephthalate (Mylar) have been subjected to such gases as $(CF_2)_4$, $C_2F_5Cl$ and $SF_6$ for a period of time and voltage to increase the corona discharge voltage, as taught by Samoden in U.S. Pat. No. 3,206,826.

It has also been known that electrical apparatus can be insulated within an enclosed system by the use of insulating gases such as mixtures of $SF_6$ and nitrogen and $CCl_2F_2$. The use of these gases in a closed system is shown in U.S. Pat. No. 3,281,521. Also, perfluorobutane $(C_2F_6)$ has been suggested in place of the $SF_6$.

Refrigerant systems are generally constructed of a condenser, a valve or capillary, an evaporator, a compressor, and conduits suitably connecting these parts. The compressor is driven by an electric motor. It is important that the refrigerant contained in the system and processed through the condenser and the evaporator by the action of the compressor not escape from the system. Accordingly, the parts of the system are interconnected so as to be as gas-tight as possible. This is done primarily by adequate sealing, but a factor in efficient retention of the fluid refrigerant is the arrangement of the parts. It is desirable to arrange the system so as to assist the sealing.

A compression refrigeration system has a motor-driven pump which circulates a halocarbon refrigerant fluid. In this system the compressor draws the halocarbon fluid in the gaseous phase of an evaporated vapor, compresses the vapor and passes the vapor to a condenser where the condensed vapor loses heat and turns into a liquid. The liquid is expelled from the condenser under high pressure to the expansion valve or capillary, where it evaporates back to the vapor phase, absorbing heat, in preparation for a return to the pump.

The compressor is driven by an electric motor which is contained within the enclosed system so that the drive to the compressor is completely within the system. Electric refrigerating system motors are completely sealed units permanently contained within the closed refrigerating system. The only breach in the system enclosure required is the provision for the power feed to the motor, the drive from the motor to the compressor being contained entirely within the system enclosure.

Capacitors are used in the electrical power circuit of refrigerating systems for the electric motor which drives the compressor. The motor-run capacitor is operated during the operating time of the motor and is thus under continuing demands. The effectiveness of the capacitor is related to its ability to meet the demands. Convolutely wound tubular capacitors are constructed by rolling spacer material between metal electrodes which are impregnated with a suitable impregnant of high dielectric constant.

SUMMARY OF THE INVENTION

It is a valuable feature to provide an arrangement in which the motor-run capacitor is adapted to the incorporation of the electric motor sealed within the refrigerating system. The area occupied by the motor-run capacitor is limited by the space considerations within the refrigerating system.

It is an object of the present invention to provide an assembly in which uncased capacitance sections are conveniently and permanently positioned within the refrigerant fluid in the refrigerant system for impregnating the capacitance section with a halocarbon vapor having high dielectric breakdown strength and preserving the dielectric breakdown strength of the dielectric material in the capacitance section.

In accordance with this invention a capacitor of the motor electrical circuit, having polypropylene dielectric, is positioned within the refrigerating system in the fluid halocarbon of the system. Preferably the capacitor is positioned in the gaseous phase of the halocarbon. The capacitor is an uncased convolutely wound section and is impregnated with the halocarbon gas. The halocarbon fluid impregnant being a dielectric, permeating the capacitor cooperates with the polypropylene dielectric of the capacitor and insulating material of the capacitor to improve the electrical characteristics of the capacitor, specifically, it suppresses corona. The uncased capacitance section is adapted to conform to the limited available area within the enclosed refrigerating system.

BRIEF DESCRIPTION OF THE DRAWING

FIG. 1 is a perspective view of a partially unrolled capacitor section of this invention, FIG. 2 is a schematic showing of the combined system of this invention, and FIG. 3 is a fragmentary showing of another embodiment of the system of FIG. 2.

DESCRIPTION OF THE PREFERRED EMBODIMENT

FIG. 1 illustrates a capacitance body 10 of the type with which the present invention is concerned. This body 10 is positioned within the refrigerating system 20 illustrated in FIG. 2. The capacitance body 10 is shown mounted in the compressor housing 31 in FIG. 2 and in the filter housing 34 in FIG. 3.

The refrigeration system 20 contains a halocarbon fluid which is in a gaseous phase 23a in one part of the refrigeration system 20 and which is in a liquid phase 23b in another part of the system. The pump 22 is of a compressor type pumping the halocarbon gaseous phase 23a from the pipe 21 and compressing it and expelling it into the pipe 24. From the pipe 24 the compressed gaseous phase 23a flows into the condenser 25. The gaseous phase 23a loses its heat in the condenser 25 and condenses to the halocarbon liquid 23b and is expelled from the condenser 25 into the pipe 26. From the pipe 26 the fluid 23b flows through constriction 27 into pipe 28 and then is evaporated in an evaporator 29 where it absorbs heat to return the halocarbon to a gaseous phase 23c.

The compressor pump 22 is driven by an electric motor 30 contained within a housing 31 which is an integral part of the system 20 together with the pipes 21, 24, 26 and 28 and the condenser 25 and evaporator 29. A drive 32 from the motor 30 operates the compressor pump 22. Power line 33 extends from the motor 30 to the exterior. Positioned in the gaseous phase 23c in housing 31 the uncased capacitance body 10 is impregnated with the gas in the housing 31. Thus, the halocarbon fluid of the refrigerant system is provided as an impregnant for the capacitance body 10.

The uncased polypropylene capacitor body 10 is impregnated with the halocarbon gas under the pressure existing within the closed system 20. The corona inception voltage of the pressure body under electrical potential is raised by the impregnation with the gas. The halocarbon gas and the polypropylene dielectric material do not interact even after long periods of operation of the capacitor under working potentials. The value of the electrical properties under long periods of use remain stable and within requirements.

A lubricating oil is provided in the ambient atmosphere within the refrigeration system. This oil does not injure the capacitor body 10. The capacitors of the present invention can be fabricated by any suitable technique from any metal conductor and polypropylene film described herein. The capacitors so fabricated can be of the rolled type or stacked type depending on the particular system designated for the capacitor. In rolled type capacitors the metal conductor layer may range from a thickness of from about 0.17 mil to about 0.5 mil while the dielectric layer of polypropylene generally ranges in thickness from about 0.25 mil to about 0.5 mil.

As stated above, the capacitor of this invention broadly comprises at least two electrically conductive layers separated by a dielectric layer of polypropylene film. The polypropylene film can be in the form of a separate free film or it can be integrally bonded to at least one of the conductive metal layers. The term "free film" is intended to refer to capacitor constructions where the dielectric layer is not secured to the conductive metal layers by means of mechanical adhesion but rather is held in place by mechanical forces resulting from the constructed form of the capacitor, e.g. rolled or stacked. In fabricating the bonded type of capacitor constructions, it is essential that this integral bonding be complete over the entire surface of the metal conductor layer or layers and that the dielectric layer of polypropylene be void free to avoid arcing and subsequent failure of the capacitor. Any technique which accomplishes this end may be employed.

The capacitor can also be fabricated by depositing a thin metal film by vapor technique onto a film of polypropylene. Alternating layers of polypropylene film and metal film can be built up in this manner until the desired capacitance is achieved. The vapor deposition of metal to form the conductive metal layer is preferred.

A typical capacitor according to the present invention is specifically illustrated in FIG. 1 which shows an uncased rolled capacitor body 10 for positioning in the refrigeration system 20 of this invention. The capacitor 10 of FIG. 1 is constructed of two polypropylene films which are each metallized on only one surface. Another construction that has proven to be advantageous in this invention employs one polypropylene film which is metallized on both surfaces and convolutely wound with a plain unmetallized polypropylene spacer. In FIG. 1 the rolled capacitor body 10 is made up of wound self-supporting metallized polypropylene films 11 and 12 each having an unmetallized margin 13 and 14.

Each of the polypropylene films 11 and 12 of approximately 0.25 mil thickness is metallized by vapor deposited metallization to a thickness of approximately 0.04 to 0.10 micron on one of its surfaces. The two metallized films 11 and 12 serve as the capacitor electrodes and are convolutely wound so that the metallization on one film contacts the plain surface of the other film. The films 11 and 12 are positioned in the winding in conventional "extended foil" fashion to provide an extended contact area for each of the films between the metallized convolute surfaces at the ends of the respective film when wound into the rolled body 10.

The structure was convolutely wound to a nominal capacitance of 1.2 $\mu f$. Terminals were connected to the respective extending electrodes by means of sprayed masses of conductive material. The section was not encased for use in this invention, and was completed by attachment of leads to the terminals.

Referring to the assembly of this invention, the uncased capacitor body is employed as the motor run capacitor of the refrigerant system 20 and is positioned, with the electric motor 30, within the closed refrigerant system subject to the fluid of the system under pressure. Thus, the uncased capacitor 10 is impregnated by the fluid while serving as part of the electric system of the pump motor. Thus, the dielectric properties the polypropylene material of the capacitor and the halocarbon fluid of the refrigeration system cooperate to suppress corona in the capacitor.

Preferably the capacitor 10 is contained within the compressor housing 31 along with the motor 30, as illustrated in FIG. 2. In this arrangement the capacitor 10 is impregnated by the halocarbon in the gaseous phase 23c.

As an example of the improvement in electrical characteristics that is achieved in accordance with this invention by incorporating an uncased rolled body having polypropylene dielectric material in a halocarbon refrigeration type gas: a capacitor was made of a double-metallized polypropylene film 0.25 mil thick and a plain 0.25 mil thick polypropylene film which were convolutely wound into a rolled section with the plain film separating the metallizations to provide a nominal capacitance of 1.2 uf. The resultant capacitor was cleared at 350 VAC. The unit was evacuated under a reduced gaseous pressure of 10 uHg and then impregnated with $C_2F_6$ under a gauge pressure of 84 lbs. per square inch. The unit was operated at 550 VAC. The following results were found with bridge measurements for capacitance and dissipation factor at approximately room temperature and at 70° C:

| | Short-Term 550 VAC Life Test For Polypropylene Capacitors | | |
|---|---|---|---|
| Time (hours) | Temp (° C) | C ($\mu f$) | DF (%) |
| 0 | 20 | 1.266 | .10 |
| 45 | 20 | 1.261 | .12 |
| 113 | 20 | 1.258 | .17 |
| 113 | 70 | — | — |
| 127 | 70 | 1.267 | .17 |
| 194 | 70 | 1.269 | .16 |
| 258 | 70 | 1.267 | .16 |
| 345 | 70 | 1.267 | .17 |

The units as described above life tested at 550 VAC operated for 113 hours at 20° C and 1542 hours at 70° C with a capacity decrease of 4% and a dissipation factor increase of from 0.08% to 0.10%.

A 0.25 mil double-metallized polypropylene and a plain 0.25 mil thick polypropylene film was convolutely wound into a rolled body capacitor rated at 13.5 $\mu$f. The uncased unit completed with terminations and leads on the respective electrodes was mounted in the suction line of the compressor of a refrigeration system containing chlorodiflouroethane (CHClF$_2$) as the refrigerant gas. The capacitor was used as the motor-run capacitor for the electric motor driving the compressor pump. The system including the capacitor was operated for over 2000 hours with the capacitor under a potential in the range of 340–365 V, and the gas pressure in the suction line was about 60 p.s.i.g. without either appreciable or significant change in electrical characteristics including capacity, dissipation factor, and resistance to corona degradation. Even after 4500 hours the capacity loss was less than 0.5%.

The advantages as described above with polypropylene film capacitors are surprising in view of unsatisfactory results from impregnation of polyester (Mylar) film capacitors with CHClF$_2$ gas, which led to a substantial rise in dissipation factor from 0.3% to 1.2 % and the resultant generation of sufficient heat to burn the Mylar.

Further sample capacitors having polypropylene film and operated with hexafluoroethane (C$_2$F$_6$) as the impregnant showed an ability to operate at 550 VAC for 2000 hours without corona degradation or loss of other electrical characteristics. A doublemetallized 0.25 mil thick polypropylene film and a plain 0.25 mil thick polypropylene film were convolutely wound into a rolled section, with the plain film separating the metallizations, to provide a nominal capacitance of 3.4 $\mu$f. The resultant capacitor was cleared at 400 VAC. The unit after evacuation was impregnated with C$_2$F$_6$ under pressure and tested for maximum corona starting voltage. At 2.5 p.s.i.g. the CSV was 455, and at 135 p.s.i.g. the CSV was $\geq$ 900.

The combination of this invention of an uncased polypropylene capacitor in the halocarbon refrigerant of a refrigeration system was also established as being effective with the widely used refrigerant CCL$_2$F$_2$. No measurable effect on the dissipation factor was found after 40 minutes at 80 p.s.i.g. of a capacitor having 0.25 mil metallized polypropylene rolled with a 0.25 mil plain polypropylene in an atmosphere of CCl$_2$F$_2$.

In the embodiment shown in FIG. 2 the capacitor 10 is assembled within the compressor housing 31 adjacent the motor 30 in a close-fitting relationship. The housing 31 is a single casing tightly sealed to the pipes 24 and 21.

The assembly of this invention can be modified as shown in FIG. 3 to provide the capacitor 10 in a mechanical filter housing 34 yet within the ambient environment of the halocarbon refrigerant. FIG. 3 shows the housing 34 connected between the housing 31 and the pipe 21. Suitable couplings 35a and 35b tightly seal the housing 34 in the refrigerant system 20. Leads 36 connect the capacitor 10 of this embodiment to the motor 30. The couplings 35a and 35 b permit ready access to the capacitor 10 for repair and replacement.

The capacitor 10 may also be positioned at other parts of the system 20, as for example, in the pipe 26 as illustrated in phantom lines in FIG. 2. The impregnant halocarbon is in the liquid phase 23b in this modification. The halocarbon fluid must adequately impregnate the capacitor section and it is preferable that elevated temperatures be avoided.

In the device of this invention the single-piece compresssor housing 31 contains the compressor pump 22, the motor 30, and the uncased capacitor 10 in a permanently sealed integral unit. This unit occupies less space and is more leakproof than previous assemblies. This advantageous combination is achieved by the coordination of the functions of the halocarbon refrigerant, the polypropylene capacitor, and the electric motor and compressor pump within the housing 31 which is in the refrigerant environment. The halocarbon gas is impregnated into the uncased capacitor section. The uncased section 10 is contained within the refrigerant along with the motor 30 so as to eliminate an opening in the sealed enclosure. Thus, the relationship of the capacitor and the motor is modified. This new combination eliminates an electrical feedthrough in the enclosure and the accompanying seal by fitting the uncased capacitor into the interior of the refrigerant system. In turn the dielectric and impregnant permit the use of an uncased capacitance section whereby the properties of the halocarbon serve to suppress corona starting voltage.

What is claimed is:

1. The combination within a sealed enclosure of a refrigeration system containing a halocarbon fluid of a motor and an uncased capacitor section containing a polypropylene spacer material, said section positioned in the halocarbon fluid within the system and being impregnated with the halocarbon fluid whereby the halocarbon fluid and the polypropylene spacer provide the dielectric for the capacitor section, and an electrical connection of the capacitor section to the motor being contained entirely within the sealed enclosure of the refrigeration system.

2. The combination as claimed in claim 1 wherein the capacitor section is positioned in and impregnated by said halocarbon fluid in the gaseous phase.

3. The combination as claimed in claim 1 wherein the capacitor section is positioned in and impregnated by said halocarbon fluid in the liquid phase.

4. The combination as claimed in claim 1 wherein the halocarbon fluid is selected from the group consisting of CHClF$_2$, C$_2$F$_6$, and CCl$_2$F$_2$.

5. The combination as claimed in claim 1 wherein a sole opening in the sealed enclosure contains solely an electrical feedthrough for the electric motor.

6. The combination as claimed in claim 1 wherein the capacitor section is comprised of metallized polypropylene having polypropylene layers in a thickness range of from about 0.25 mil to about 0.5 mil.

7. In combination an enclosed refrigeration system having a one piece chamber within the system, and in said chamber a pump for circulating a halocarbon fluid in the system, a motor associated with the refrigeration system for driving the pump, an uncased capacitor body containing a polypropylene spacer material for the motor mounted within the refrigeration system adjacent the motor and in the halocarbon fluid in the chamber so that the fluid is impregnated into the capacitor body whereby the halocarbon fluid and the polypropylene spacer provide the dielectric for the capacitor body and the breakdown voltage of the capacitor is improved.

* * * * *